United States Patent [19]

Job

[11] Patent Number: 4,563,835
[45] Date of Patent: Jan. 14, 1986

[54] BIRD HOUSE TRAP

[76] Inventor: Clarence A. Job, P.O. Box 163, Arlington Dr., Kelso, Mo. 63758

[21] Appl. No.: 533,412

[22] Filed: Sep. 19, 1983

[51] Int. Cl.$^4$ ............................................. A01M 23/04
[52] U.S. Cl. ............................................ 43/69; 43/60
[58] Field of Search ................... 43/68, 61, 67, 74, 69; 119/17, 23

[56] References Cited

U.S. PATENT DOCUMENTS

| | | | |
|---|---|---|---|
| 114,062 | 4/1871 | Stowe et al. | 43/68 |
| 784,453 | 3/1905 | Voelkerding et al. | 43/68 |
| 799,472 | 9/1905 | Kirk | 43/68 |
| 1,635,224 | 7/1927 | Rowley | 43/69 |
| 1,738,623 | 12/1929 | Westerlund | 43/69 |
| 1,847,508 | 3/1932 | Wikerson | 43/74 |
| 1,887,869 | 11/1932 | Clampitt | 119/17 |
| 3,423,820 | 1/1969 | Host | 43/69 |
| 3,778,922 | 12/1973 | Clark | 43/61 |

FOREIGN PATENT DOCUMENTS 805490 12/1958 United Kingdom ................. 119/17

OTHER PUBLICATIONS

"Popular Science", Jul. 1939; Dial Bird House Suits any Tenant.

Primary Examiner—Nicholas P. Godici
Assistant Examiner—M. Jordan
Attorney, Agent, or Firm—Paul M. Denk

[57] ABSTRACT

A bird house trap is disclosed which comprises an enclosed bait compartment or house, a bird containment compartment, and a dividing wall between the bait compartment and the containment compartment. An entrance opening is provided in the bait compartment and an escape opening is provided in the dividing wall leading from the bait compartment to the containment compartment. The entrance opening is spaced above the escape opening. A so-called bait housing is provided within the bait compartment and is movable between a raised position in which the bait housing is in register with the entrance opening thereby to permit a bird to enter the bait housing, and a lowered position in which the bait housing is in register with the escape opening thereby to permit the bird to move from the bait housing into the containment compartment. The bait housing is balanced on a counterbalance arm and is normally in its upper position such that when a bird enters the bait housing, the weight of the bird will cause the bait housing to move from its upper to its lower position.

1 Claim, 7 Drawing Figures

BIRD HOUSE TRAP

BACKGROUND OF THE INVENTION

This invention relates to a bird house trap which is particularly effective in trapping alive selected species of birds, such as English sparrows and starlings, without injury to the birds, thus permitting removal of the birds to another site or destruction of the birds.

In many instances, unwanted species of birds, such as English sparrows and starlings, are considered pests. Oftentimes, these pest birds rob the nests of more desirable species, such as purple martins. Also, these pest species of birds may cause damage to buildings, eat garden vegetables, destroy grain, and generally make pests of themselves.

A number of different types of bird traps are known. Certain types of the known bird traps kill the pest birds upon trapping them. Other types of bird traps are not selective in the types of birds they trap, and thus may trap (and in some instances destroy) wanted or endangered species as well as pest species. In other instances, the prior art bird traps are only operable to trap one bird at a time, and thus must be reset for each bird trapped.

SUMMARY OF THE INVENTION

Among the several objects and features of the present invention may be noted the provision of a bird house trap which is capable of effectively trapping a number of birds in a given length of time (e.g., one or two days) without the necessity of resetting the trap or removing the trapped bird after each bird is trapped;

The provision of such a bird house trap which does not injure the birds trapped;

The provision of such a bird house trap which is selective in the species of birds trapped so as to prevent the trapping desirable bird species; and The provision of such a bird house trap which is of simple and rugged construction, which is readily mountable in a variety of locations, which is not adversely affected by the weather, and which is of low cost and low maintenance.

Other objects and features of this invention will be in part apparent and in part pointed out hereinafter.

Briefly stated, a bird house trap is disclosed which comprises a bait compartment or house, a bird containment compartment, and a dividing wall between the bait compartment and the containment compartment. An entrance opening is provided in the bait compartment and an escape opening is provided in the dividing wall leading from the bait compartment to the containment compartment. The entrance opening is spaced above the escape opening. A so-called bait housing is provided within the bait compartment and is movable between a raised position in which the bait housing is in register with the entrance opening thereby to permit a bird to enter the bait housing via the entrance, and a lowered position in which the bait housing is in register with the escape opening thereby to permit the bird to move from the bait housing into the containment compartment. The bait housing is balanced on a counterbalance arm or the like and is normally in its upper position such that when a bird enters the bait housing, the weight of the bird will cause the bait housing to move from its upper to its lower position.

BRIEF DESCRIPTION OF THE DRAWINGS

Corresponding reference characters indicate corresponding parts throughout the several views of the drawings.

DESCRIPTION OF A PREFERRED EMBODIMENT

Figure 1:
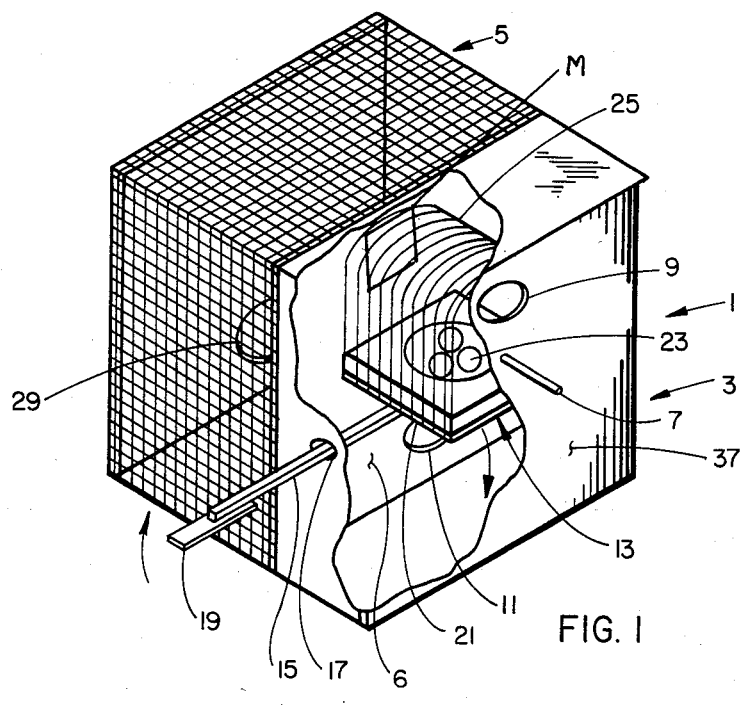
FIG. 1 is a perspective view of a bird house trap of the present invention with portions broken away.
Figure 2:
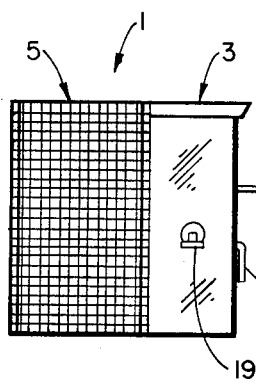
FIG. 2 is a left elevational view of FIG. 1 on a reduced scale.

Referring now to the drawings, a bird house trap of the present invention is indicated in its entirety by reference character 1. The bird house trap 1 is shown to be comprised of an enclosed bait compartment or house 3 and a so-called containment compartment 5. A dividing wall 6 separates the bait compartment from the containment compartment. A perch 7 is provided on the front wall of the bait compartment below an entrance opening 9. Entrance opening 9 is sized so as to permit unwanted birds, such as starlings and English sparrows, entrance into the bait compartment, but is sized so as to not be attractive to the entrance of preferred species such as purple martins, wrens and the like. A so-called escape opening 11 is provided in dividing wall 6 providing communication between the bait compartment and the containment compartment. As best shown in FIG. 1, entrance opening 9 is spaced above the level of escape opening 11.

Figure 4:
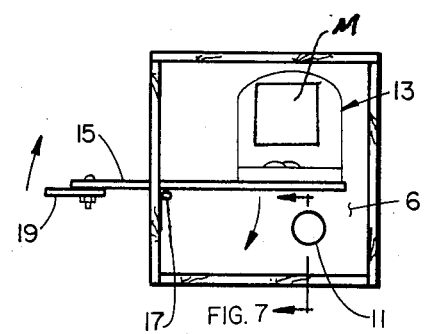
FIG. 4 is a front elevation view with the front door removed illustrating a bait housing located within a bait compartment of the trap with the bait housing in its raised position.

Further, in accordance with this invention, a so-called movable bait housing 13 is provided within bait compartment 3 and is movable from a raised position (as shown in FIGS. 1 and 4) in which entrance opening 9 is in register with the bait housing and a lowered position (not shown) in which the bait housing is in register with escape opening 11. Bait housing 13 is mounted on an arm 15 which is pivoted relative to bait compartment 3 at a pivot point or pin 17. Arm 15 extends out beyond the exterior of the enclosed bait housing and carries a counterweight 19 of a predetermined weight so as to counterbalance bait housing 13 in its raised position. The counterbalancing of the bait housing 13 on arm 15 is such that upon a bird entering the bait housing via entrance passage 9 and placing its weight on the bait housing, the bait housing will move downwardly under the biasing weight of the bird such that the only escape from the bait housing is via escape opening 11. As the bird attempts to leave the bait housing, it passes through escape opening 11 into containment housing 5. When the bird leaves the bait housing 13, counterweight 19 will again raise the bait housing to its raised position, thus resetting the trap and making it possible to trap a number of birds without the necessity of a person resetting the trap.

Figures 5, 6:
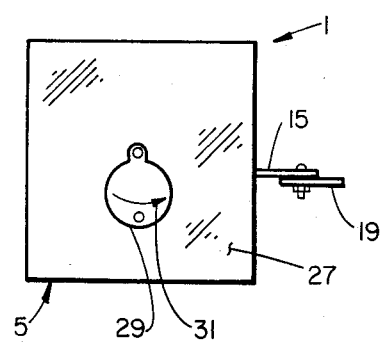
FIG. 5 is a top plan view of the bird trap with a portion broken away showing the bait housing located within the bait compartment.
FIG. 6 is a rear elevational view of the trap.

More specifically, bait housing 13 includes a base 21 which is preferably formed in the shape of a nest. Bait 23 is located in base 21 and this bait may be in the form of artificial bird eggs or the like. Further, a bait housing enclosure 25 extends up from base 21 and thus constitutes the bait housing. As shown in FIG. 5, the sides of the bait housing fit closely to the sides of the bait compartment, but yet the bait housing is free to move vertically. On dividing wall 6, a mirror M may be optionally provided in register with entrance opening 9 so that a bird resting on perch 7 and looking into opening 9 will see a reflection of himself which in turn will lure him into the bait housing.

As shown in FIG. 6, bird house trap 1 includes a back wall 27 constituting the back wall of containment compartment 5. This back wall 27 has a removal opening 29 therein sized to permit one to insert his hand into containment compartment 5 and to remove a trapped bird therefrom. Normally, removal opening 29 is closed by a swing door 31 which may be latched in its closed position.

Figure 7:
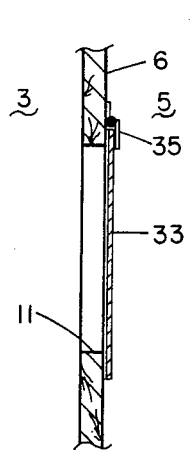
FIG. 7 is a vertical cross sectional view on an enlarged scale taken along line 4—4 of a dividing wall between the bait compartment and the containment compartment of the trap illustrating a hinged trap door on the containment compartment side of the dividing wall.

As shown in FIG. 7, escape opening 11 is provided with a trap door 33 of preferably plexiglass, or wire screen or the like on the side thereof disposed within containment compartment 5. Trap door 33 is hingedly supported from a hinge 35 at its top relative to dividing wall 6. As shown in FIG. 7, trap door 33 is somewhat longer than the diameter of escape opening 11. It will be appreciated that when a bird enters bait housing 13 and when the bait housing moves toward its lowered position, the bird within the bait housing may readily open door 33 thereby permitting the bird to enter the containment compartment. Of course, once the bird enters the containment compartment, the trap door will be returned by gravity to its closed position, and since the trap door is longer than the opening 11, the bird will not be able to escape from the containment compartment via escape opening 11.

Figure 3:
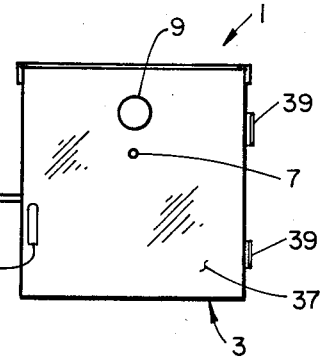
FIG. 3 is a front elevational view of FIG. 1.

The front wall 37 of bait compartment 3 may be hingedly supported to the sides of the bait compartment, as indicated by hinges 39 (shown in FIG. 3), for access to bait housing 13. Further, a latch 41 may be provided on the front wall 37 opposite the hinges 39 so as to permit the door to be opened and closed and latched in its closed position. Alternatively, the roof or top of bait house 3 may be removable for access to the bait housing.

It will be readily appreciated by those skilled in the art that a variety of means may be employed to permit lowering of bait housing 13 from its raised to its lowered position upon the entrance of a bird into the bait housing. However, it is believed advantageous that the elongate counterbalancing arm 15 which extends through the opening in the side wall of the bait compartment to the exterior of the trap is beneficial in that if the bait housing is stuck in its lowered position, as may be caused by changes in weather conditions or in bird droppings accumulating on the bait housing base 21 so as to change the counterbalancing of the bait housing, the landing of another bird on arm 15 extending exteriorly of the bait housing will cause the bait housing to be raised to its upper position. Also, the condition of the trap (i.e., whether it is in its raised or its lowered position) can be readily visually determined even if the trap is located on an elevated post or the like. Still further, by changing the relative position of arm 15 on pivot 17 and/or by adding or subtracting counterweights 19 or by slidably moving the counterweight inwardly or outwardly relative to pivot 17, the counterbalancing of bait housing 13 may be varied, depending on a variety of conditions. Further, by utilizing egg-shaped bait 23, birds, such as starlings, which rob the eggs of other nests, has proved to be an effective bait or lure. This trap has been proven to be effective in trapping mature sparrows who attempt to nest in purple martin houses or the like.

In view of the above, it will be seen that the other objects of this invention are achieved and other advantageous results obtained.

As various changes could be made in the above constructions without departing from the scope of the invention, it is intended that all matter contained in the above description or shown in the accompanying drawing shall be interpreted as illustrative and not in a limiting sense.

What is claimed is:

1. A bird trap comprising a bait compartment, a containment compartment, a dividing wall between said bait and containment compartments, said bait compartment formed of a series of walls, an entrance opening in said bait compartment, an escape opening in said dividing wall leading from said bait compartment to said containment compartment, said entrance opening being above said escape opening, a bait housing within said bait compartment movable between a raised position in which said bait housing is in register with said entrance opening thereby to permit a bird to enter said bird trap via said entrance opening and a lowered position in which said bait housing is in register with said escape opening thereby to permit a bird within said bait housing to enter said containment compartment, said bait housing being pivotally mounted with respect to one of said bait compartment walls to provide movement between said raised and lowered positions, means biasing said bait housing in its upper position, and the entrance of a bird into the bait housing effecting movement of said bait housing to its lowered position upon a bird entering therein, said biasing means extending externally of said bait compartment, said biasing means being a counterbalance, said counterbalance including an adjustable counterweight, said counterbalance including an arm carrying said counterweight, said arm supporting the bait housing, and extending laterally exteriorly of said bait compartment, said arm supporting said bait housing at one end, and the counterweight at its other end, and said arm being pivotally connected to one of the bait compartment walls and providing for the pivotal movement with respect thereto, a trap door hinged at the top of the containment side of the dividing wall and cooperating with said escape opening permitting a bird to enter said containment compartment, but preventing the escape therefrom via said escape opening, and said trap door being transparent.

* * * * *